United States Patent [19]

Sato et al.

[11] 3,938,297
[45] Feb. 17, 1976

[54] FITTINGS FOR CONNECTING COLUMNS AND BEAMS OF STEEL FRAME CONSTRUCTION

[75] Inventors: Kuniaki Sato, Hiratsuka; Kozo Toyama, Tokyo; Eiji Matsushita, Fujisawa; Akio Tomita; Shuei Suzuki, both of Tokyo, all of Japan

[73] Assignee: Kajima Corporation, Tokyo, Japan

[22] Filed: Feb. 21, 1975

[21] Appl. No.: 551,914

[52] U.S. Cl. ............... 52/758 F; 52/760; 403/406; 403/189
[51] Int. Cl.² ......................................... F16B 7/00
[58] Field of Search ........... 403/187, 189, 231, 232, 403/388, 406, 407, 169–178; 52/758 R, 758 B, 758 F, 760

[56] References Cited
UNITED STATES PATENTS

| | | | |
|---|---|---|---|
| 1,102,502 | 7/1914 | Hansbrough | 403/187 |
| 1,813,545 | 7/1931 | Reinhold | 52/760 X |
| 1,982,343 | 11/1934 | Kane | 52/758 R |
| 2,114,901 | 4/1938 | Henderson | 52/758 R |
| 2,146,332 | 2/1939 | Deming | 403/406 X |
| 2,163,209 | 6/1939 | Pungel | 52/758 B X |
| 2,201,826 | 5/1940 | Ditchfield | 52/758 R X |
| 2,374,550 | 4/1945 | McIntosh | 403/189 X |
| 3,591,214 | 7/1971 | Gallay | 52/758 F |
| 3,661,048 | 5/1972 | Judd | 52/758 F |

FOREIGN PATENTS OR APPLICATIONS

| | | | |
|---|---|---|---|
| 517,107 | 1/1940 | United Kingdom | 403/312 |
| 654,930 | 1/1938 | Germany | 403/187 |

*Primary Examiner*—Werner H. Schroeder
*Assistant Examiner*—Wayne L. Shedd

[57] ABSTRACT

Fittings for connecting columns and beams of a steel frame construction comprise an upper flange fitting and a lower flange fitting. The upper flange fitting comprises a substantially rectangular base plate to be bolted to a web of the column and protrusions extending from the base plate to be welded to an upper flange and a web of the beam. The lower flange fitting comprises a substantially rectangular base plate to be bolted to the web of the column and a horizontal plate projecting from the base plate to be bolted to a lower flange of the beam.

3 Claims, 14 Drawing Figures

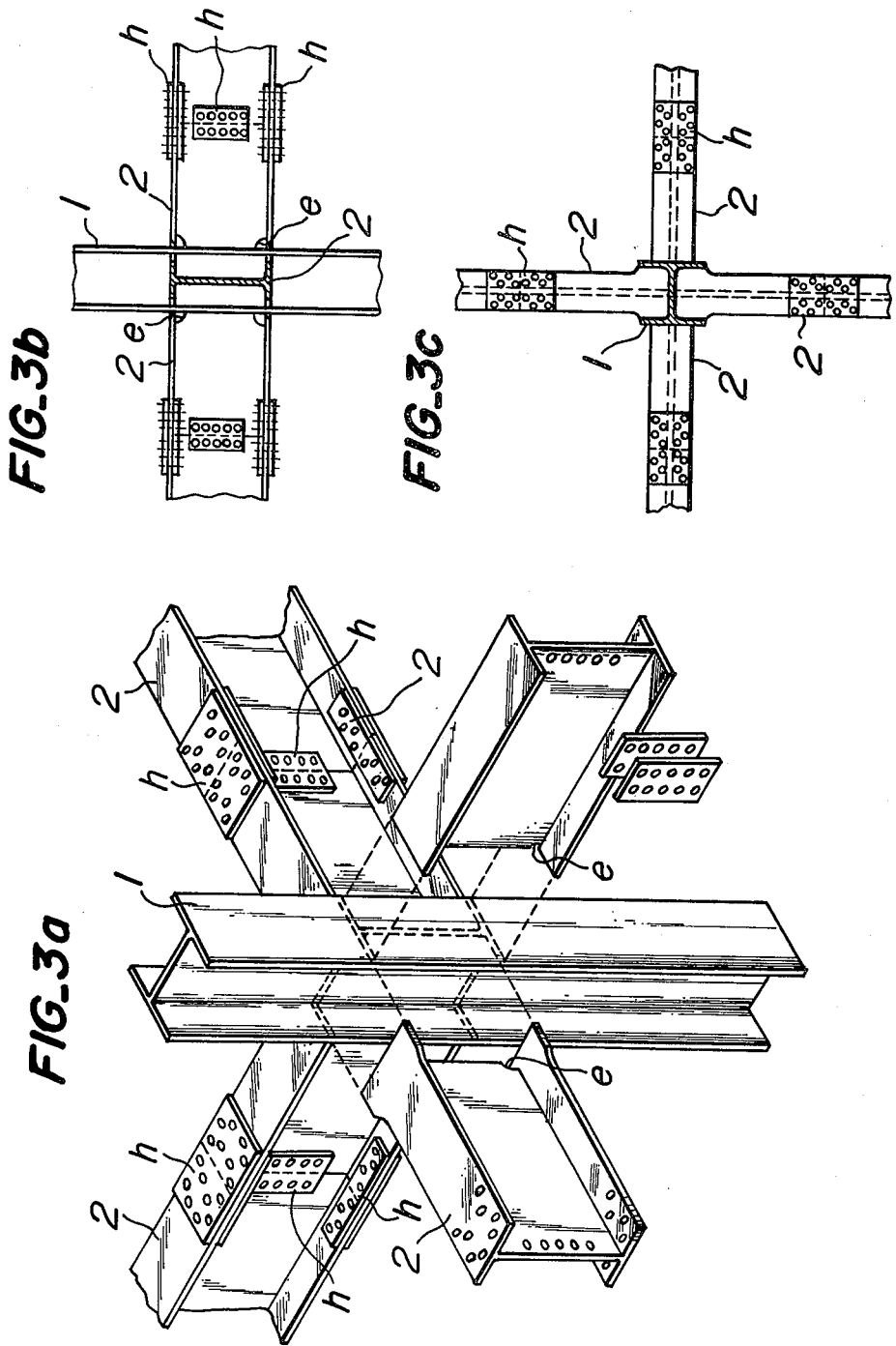

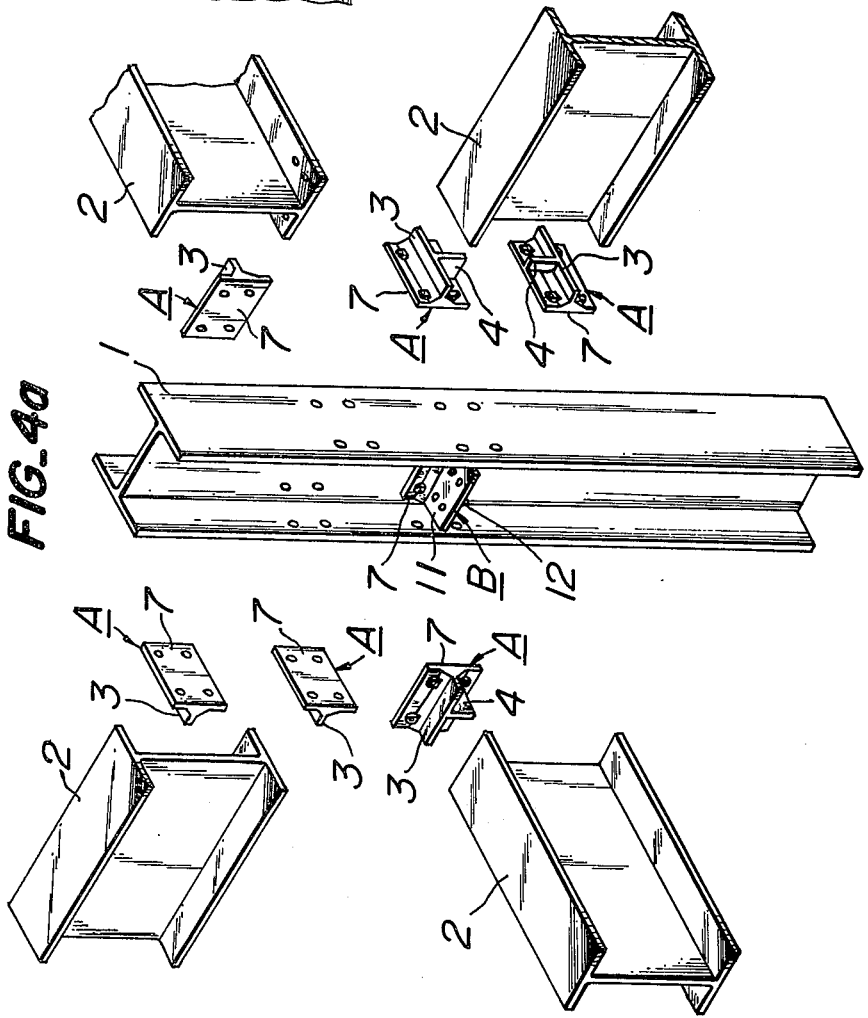
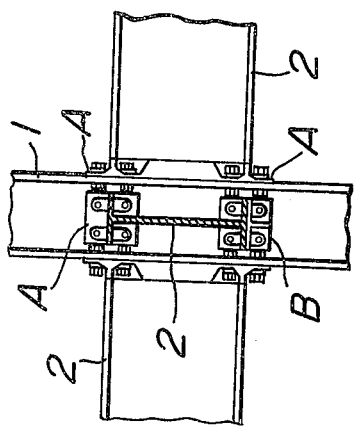
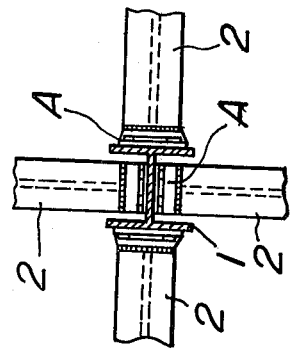

3,938,297

FITTINGS FOR CONNECTING COLUMNS AND BEAMS OF STEEL FRAME CONSTRUCTION

BACKGROUND OF THE INVENTION

1. Field of the Invention

The invention relates to fittings for connecting columns and beams of a steel frame construction and a method of connecting columns and beams and more particularly suitable for connecting beams having an H-shaped section to a web of a column having an H-shaped section.

2. Description of the Prior Art

In prior art steel frame construction, T-shaped members each of which may be obtained by cutting H-shaped steel have often been used for connecting columns and beams. However, such T-shaped members are insufficient to transmit a shearing force acting on the beam to the column, so that a web of the beam must generally be connected to a flange of the column by means of separate joint members which would make the construction method complicated and expensive.

In another prior art steel frame construction, welding members of steel plate are welded to the flanges of the beam for connecting the column to the beam. In that case, however, the beam must be provided at corners between its flanges and web with notches required for welding operation. Accordingly, the notches make it insufficient to transmit a shearing force acting upon the beam to the column so that separate joint members are also required for the construction. Moreover after the plate members have been connected to the web of the beam by means of a fillet weld joint, the plate members may be deformed owing to stresses caused in welding which must be corrected by a troublesome method. If concentrated stresses acting upon the column from the flanges of the beam are relatively large, horizontal reinforcement plates must be welded between the flanges of the column for the purpose of a reinforcement of the construction.

In further prior art steel frame construction, columns and beams are directly connected by welding. In the connecting method, if heights of the beams gathered together at the column are not equal, horizontal reinforcement plates are required as in the prior art above described. It is usual to weld short length beams to the column in order to make it easy to transport the column from a factory to a field, but the transportation of the column having welded the short length beams is more difficult than that of single columns or beams, and such a column requires a troublesome operation for connecting the short length beams to more longer or standard beams with splice plates in the field. Moreover, there would be required bevelings at edges of the beams to be welded and notches at corners between the flanges and the webs of the beams which require a complicated working, and the webs of the beams are in intimate contact with the column for fillet welding, so that the edges of the beams to be welded should be worked with a sufficient high accuracy.

As described above, in the prior art, connections of columns and beams in steel frame construction generally required extra joint members and need complicated working and assemblies of the members and further have only low joint efficiency.

SUMMARY OF THE INVENTION

In order to overcome the above disadvantages in the prior art the fittings according to the invention each comprising an upper flange fitting and a lower flange fitting, said upper flange fitting comprising a substantially rectangular base plate to be connected to said column having centrally a horizontally continuous thicker portion from which the base plate is tapered, a horizontal protrusion projecting from said thicker portion in opposition to a flange of said beam, a vertical protrusion in opposition to a web of said beam and projecting from said base plate to form with said horizontal protrusion a T-shaped protrusion, and seats formed on the base plate and formed with holes for bolts, and said lower flange fitting comprising a substantially rectangular base plate to be connected to said column having centrally a horizontally continuous thicker portion from which the base plate is tapered, a horizontal plate projecting from said thicker portion for supporting a lower flange of said beam and formed with holes for bolts, a vertical reinforcement plate vertically extending downwardly from the horizontal plate to form therewith a T-shaped shelf, and seats formed on said base plate and formed with holes for bolts.

In another aspect the invention provides a method of connecting beams having an H-shaped section to a column having an H-shaped section of a steel frame construction, comprising steps of providing an upper flange fitting comprising protrusions in opposition to an upper flange and a web continual thereto of said beam, a base plate tapered from a bottom of said protrusion in opposition to the flange of said beam toward upper and lower portions of the base plate and seats having holes for bolts formed in said base plate; welding said protrusions of said upper flange fitting to said upper flange and said web of said beam, respectively; providing a lower flange fitting comprising a horizontal plate formed with holes for bolts for supporting a lower flange of said beam thereon and bolted thereto, a vertical reinforcement plate under said horizontal plate, a base plate tapered from a bottom of said horizontal plate toward upper and lower portions of the base plate and seats having holes for bolts formed in said base plate; bolting said lower flange fitting in position to a web of said column; bringing the end of said beam having said upper flange fitting welded thereto to the web of said column such that said lower flange of said beam is located on said horizontal plate of said lower flange fitting and said base plate of said upper flange fitting is in contact with said web of said column; and bolting said lower flange of said beam to said horizontal plate of said lower flange fitting and said base plate of said upper flange fitting to said web of said column.

An object of the invention is to provide improved fittings for connecting columns and beams of a steel frame construction capable of simplifying manufacture of steel frame members in a factory, transportation of the members and execution of works in building site to save the labor and to increase its efficiency and having a higher joint efficiency than that of the prior art to ensure an improved safety of the construction.

Another object of the invention is to provide an improved method of connecting beams to a web of a column of a steel frame construction capable of saving labor and increasing the joint efficiency to ensure an improved safety of the construction.

BRIEF DESCRIPTION OF THE DRAWINGS

FIG. 3a is a perspective view of part of a steel frame construction directly connecting columns and beams in the prior art;

FIG. 3b is a front elevation of the portion of FIG. 3a;

FIG. 3c is a plan view of the portion of FIG. 3b;

FIG. 4a shows the method of connecting a column with beams according to the invention;

FIG. 4b is a front elevation of the connection shown in FIG. 4a;

FIG. 4c is a plan view of the connection shown in FIG. 4a;

DESCRIPTION OF THE PREFERRED EMBODIMENTS

Figure 1:
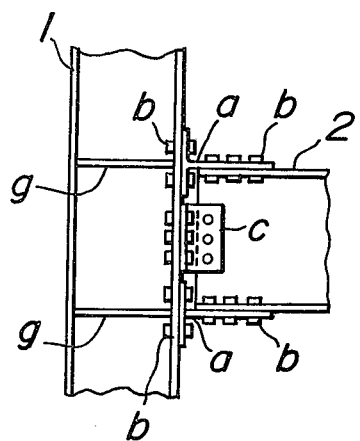
FIG. 1 is a side elevation of a connection of a column and a beam of a steel frame construction using T-shaped members in the prior art.
Figure 2:
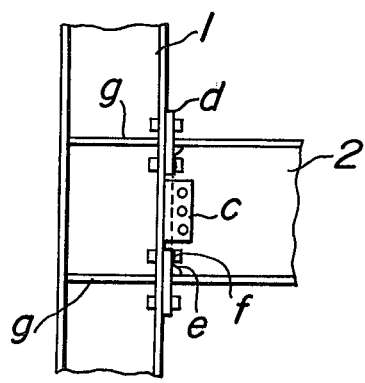
FIG. 2 is a side elevation of a connection of a steel frame construction using welding plates in the prior art.

Referring to FIGS. 1-3, there are shown connections of columns 1 and beams 2 hitherto used. The connection shown in FIG. 1 utilizes T-shaped members $a$ each of which may be obtained by cutting H-shaped steel or by welding steel plates.

The flanges of the beam 2 are fixed to the flange of the column 1 through the T-shaped members $a$ connected to the flanges of the beam and the column by means of high strength bolts $b$. The T-shaped members are insufficient to transmit a shearing force acting upon the beam 2 to the column 1, so that a web of the beam 2 must generally be connected to the flange of the column by means of separate joint members $c$ (FIG. 1).

Referring to FIG. 2, welding members $d$ of steel plates are welded to the flanges of the beam 2. In the case, the beam must be provided with notches $e$ at corners between the flanges and the web required for the welding operation. Accordingly, when the plate members $d$ are connected to the web of the beam 2 by means of a fillet weld joint $f$, the plate members $d$ may be deformed or curved owing to stresses caused in welding which must be corrected by a troublesome method. Moreover, the notches $e$ make it insufficient to transmit a shearing force acting upon the beam 2 to the column 1 so that joint members $c$ are also required for the construction.

If concentrated stresses acting upon the column 1 from the flanges of the beam are relatively large, horizontal reinforcement plates $g$ must be welded between the flanges of the column 1 for the purpose of a reinforcement of the construction.

It can be seen from the above description that the connections of columns and beams hitherto used in steel frame constructions require many joint members, and need complicated working and assemblies of the members and further have only low joint efficiencies.

In FIG. 3 showing further prior art, columns 1 and beams 2 are directly connected by welding. In the connecting method, if heights of the beams 2 gathered together at the column 1 are not equal, horizontal reinforcement plates $g$ similar to those in FIGS. 1 and 2 are required. It is usual to weld short length beams to the column as shown in FIG. 3 to make it easy to transport the column from a factory to a field, but it requires a troublesome operation for connecting the short length beams to more longer or standard beams with splice plates $h$ in the field. Moreover, there would be required bevelings at edges of the beams to be welded and notches $e$ at corners between the flanges and the webs which require a complicated working, and the webs of the beams are in intimate contact with the column for fillet welding, so that the edges of the beams to be welded should be worked with a sufficient high accuracy.

As shown in FIG. 3, although short length beams are connected to the column to make it easy to transport these members, the transportation of the column having welded the short length beams is more difficult than that of single columns or beams.

The invention intends to eliminate these disadvantages in the prior art and provide a steel frame construction having a high joint efficiency without requiring any horizontal reinforcement plate or stiffener for columns and splice plate for beams and columns and without requiring any notches in the beams and any holes for bolts withstanding shearing stresses.

The embodiments of the invention for connecting H-shaped beams 2 to H-shaped column 1 will be explained referring to FIGS. 4–10.

Figure 5:
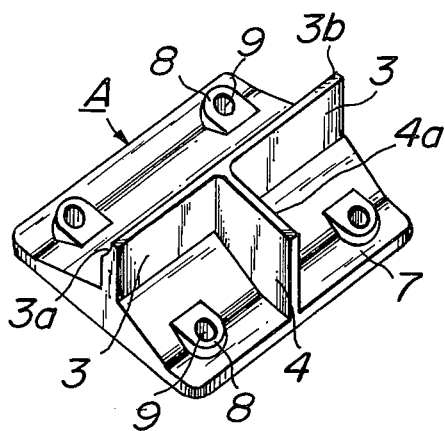
FIG. 5 is a perspective view of the upper flange fitting according to the invention.
Figure 6:
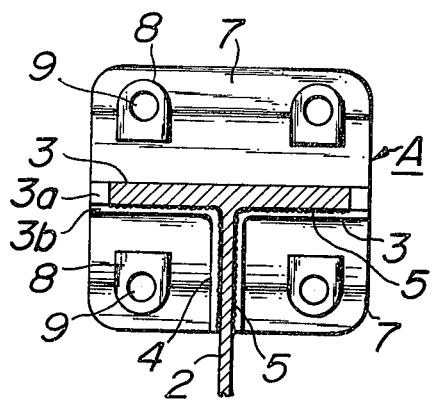
FIG. 6 is a front elevation of the fitting shown in FIG. 5 showing a section of a beam connected to the fitting.
Figure 7:
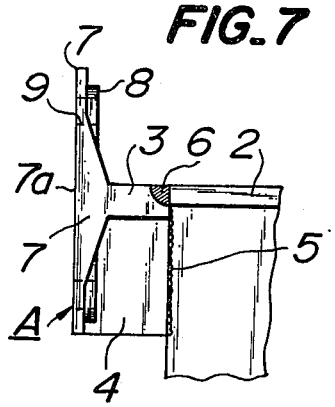
FIG. 7 is a side view of the fitting and part of the beam shown in FIG. 6.

Referring first to FIGS. 5–7 showing a fitting A of a preferred embodiment of the invention for use in an upper flange of a beam, the fitting A is provided with a horizontal protrusion 3 adapted to be in opposition to the flange of the beam 2, which is formed along its one edge with a beveling 3a for butt welding with the flange of the beam. The fitting is further provided with a vertical protrusion 4 forming with the protrusion 3 a T-shaped protrusion, the upper surface 4a of which has a width sufficient to be in contact with the web of the beam 2 for fillet welding and is flush with the upper surface 3b of the horizontal protrusion 3. Prior to the butt welding of the flange, the fillet welding portions 5 extend as shown in FIGS. 6 and 7 which may prevent a weld drip of the butt welding 6. A base plate 7 is tapered toward its opposite ends or upper and lower ends, of which gradient affects on the joint efficiency so that it should be determined depending upon a shape of the base plate and a yield strength and arrangement of the bolts. The plate 7 is formed with seats 8 each having a through hole 9 for a bolt to provide surfaces in close contact with the bolts or washers.

A surface 7a of the fitting which is adapted to be in contact with the flange of the column is generally flat mating with the surface of the flange. However, the surface 7a may be any configuration matching a surface of the flange, if it is uneven or curved. The fitting according to the invention is made as a unitary body by casting or drop-forging or a combination of rolling and welding or extruding and welding. In the combination of these workings, the seats 8 are made continuous in the direction of the horizontal protrusion so as to be able to form integrally by rolling or extruding or are separately welded to the fitting body and the vertical protrusion 4 is welded to the body.

Figure 8:
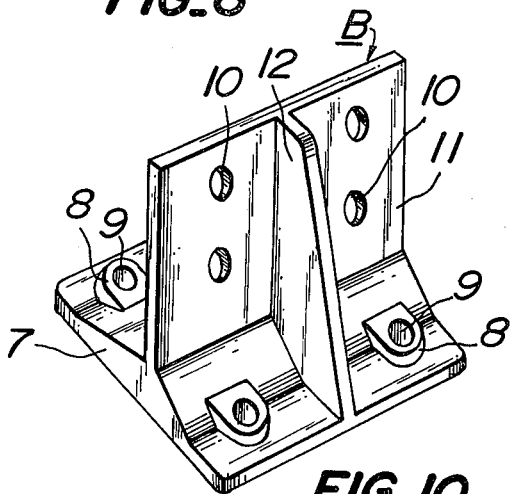
FIG. 8 is a perspective view of the lower flange fitting according to the invention.
Figure 9:
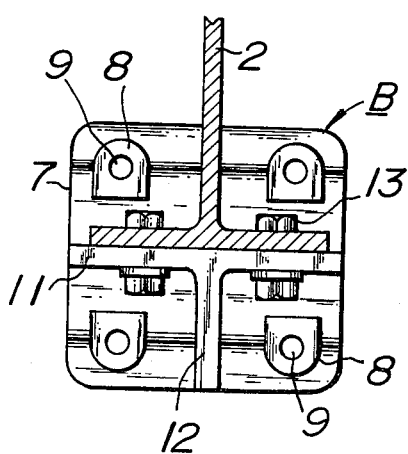
FIG. 9 is a front elevation of the fitting shown in FIG. 8 showing a section of a beam bolted thereto.
Figure 10:
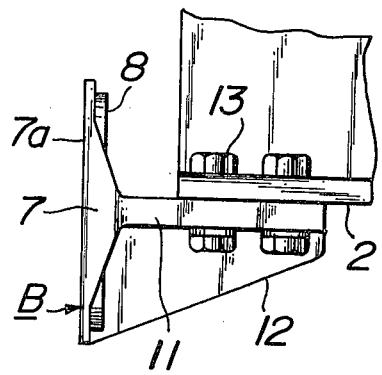
FIG. 10 is a side view of the fitting and the part of the beam shown in FIG. 9.

FIGS. 8–10 show a fitting B of a preferred embodiment of the invention for use in a lower flange of a beam, wherein the same reference numerals as in the fittings A have been utilized to identify like part.

The fitting B is provided with a horizontal plate 11 formed with holes 10 for bolts by means of which the lower flange of the beam supported on the horizontal plate is bolted thereto. The fitting B is further provided with a vertical reinforcement plate 12 vertically extending downwardly from the horizontal plate 11 to form a T-shaped shelf. A base plate 7 is tapered from the bottom of the horizontal plate 11 toward the opposite ends or upper and lower ends and is formed with seats 8 each having a through hole 9 for a bolt. The fitting is made as a unitary body by casting or drop-forging or a combination of rolling and welding or extruding and welding.

The method of connecting a column and beams by means of the fittings will be explained hereinafter.

In case of connecting a beam to a flange of a column, two fittings A are symmetrically in opposition to each other, one upon the other, as shown at the upper left hand and lower right hand in FIG. 4a, of which vertical protrusions 4 are connected to edge surface of the web of the beam 2 by butt welding and of which horizontal protrusions 3 are connected to edge surfaces of the upper and lower flanges of the beam 2 by butt welding. Ordinarily, the welding operation is carried out in a factory. The base plates of the fittings A connected to the beam 2 are brought into contact with the outer surface of the flange of the column 1 in position and bolted thereto in the field.

In case of connecting a beam to a web of a column, a fitting A is arranged in opposition to the beam as shown at the upper right hand and lower left hand in FIG. 4a, of which protrusions 3 and 4 are connected to edge surfaces of the flange and web of the beam 2, respectively, by butt welding as shown in detail in FIGS. 6 and 7. The welding is usually effected in a factory.

A fitting B is then bolted in position to the web of the column 1 as shown at the center of FIG. 4a. The end of the lower flange of the beam 2 having the fitting A welded at the upper flange and the web is located on the horizontal plate 11 of the fitting B bolted to the column 1 and is clamped thereto by means of bolts 13. The fitting A is bolted to the column 1 or is bolted to an adjacent fitting A through the column 1.

It is to be understood that the fittings according to the invention are suitable not only to connect beams to flanges of columns but also to connect beams to webs of the columns.

The effects of the fittings according to the invention distinguishable over those of the prior art are as follows.

1. According to the invention the fitting is provided with the base plate which is thickest at the bottom of the horizontal protrusion and is tapered toward its opposite ends, so that it has a greatly higher yield strength against a bending moment in comparison with those of the prior art to improve the joint efficiency of the column and beam remarkably thereby obtaining a high rigidity at the connection thereof and improving a continuous beam effect.

2. In connection of H-shaped beams to a web of a column, fittings A for upper flanges of the beams are connected by welding to the beams 2 in a factory and fittings B for lower flanges of the beams are bolted in position to the column 1, on the horizontal plates of which fittings B are then located the lower flanges of the beams and bolted thereto, thereafter the fittings A are bolted to the column 1. Accordingly, a welding operation in field is not needed, so that the connection of the beams to the web of the column can be rapidly effected with ease.

3. According to the invention it is not required to provide horizontal stiffeners needed in the prior art as shown in FIG. 3 and therefore the column members are only subjected to drilling and cutting off operations without requiring any welding operation, so that working operations of a steel frame construction can be saved to one half to one third of those in the prior art. In addition, according to the invention there is no possibility of deformation of the members caused by welding, so that a steel frame construction with a high accuracy can be obtained.

4. The configuration of respective portions of the fittings according to the invention can be determined depending upon required stresses acting thereupon. Moreover, the fittings are favorable for mass-production by casting or drop-forging as a unitary body or a combination of rolling and welding or extruding and welding which serve to industrialize such building operations.

5. According to the invention the fittings having a high rigidity are connected to the webs of the columns to reinforce effectively the frame construction against the stresses acting onto panel zones between the columns when the frame construction is subjected to a horizontal force in the direction perpendicular to the surfaces of the flanges of the columns.

6. According to the invention the fittings B for the lower flanges of the beams are provided with the vertical reinforcement plates 12 which can be utilized as gusset plates for braces if desired.

7. According to the invention horizontal stiffeners for beams to be connected to the flanges of the column are not needed, so that th height of beams to be connected to the web of the column can be determined independently with that of beams to be connected to the flanges of the column.

It is understood by those skilled in the art that the forgoing description is preferred embodiments of the invention and that various changes and modifications may be made in the invention without departing from the spirit and scope thereof.

What is claimed is:

1. Fittings for connecting columns and beams of a steel frame construction, comprising an upper flange fitting and a lower flange fitting, said upper flange fitting comprising a substantially rectangular base plate to be connected to said column having centrally a horizontally continuous thicker portion from which the base plate is tapered, a horizontal protrusion projecting from said thicker portion in opposition to a flange of said beam, a vertical protrusion in opposition to a web of said beam and projecting from said base plate to form with said horizontal protrusion a T-shaped protrusion, and seats formed on the base plate and formed with holes for bolts, and said lower flange fitting comprising a substantially rectangular base plate to be connected to said column having centrally a horizontally continuous thicker portion from which the base plate is tapered, a horizontal plate projecting from said thicker portion for supporting a lower flange of said beam and formed with holes for bolts, a vertical reinforcement plate vertically extending downwardly from the horizontal plate to form therewith a T-shaped shelf, and seats formed on said base plate and formed with holes for bolts.

2. Fittings as set forth in claim 1, wherein said horizontal protrusion of said upper flange fitting is formed along its edge with a beveling for butt welding.

3. A joint for steel frame construction comprising a column and a beam connected therewith by means of a fitting said fitting comprising an upper flange fitting and a lower flange fitting, said upper flange fitting comprising a substantially rectangular base plate connected to said column having centrally a horizontally continuous thicker portion from which the base plate is tapered, a horizontal protrusion projecting from said thicker portion in opposition to a flange of said beam, a vertical protrusion in opposition to a web of said beam and projecting from said base plate to form with said horizontal protrusion a T-shaped protrusion, and seats formed on the base plate and formed with holes for bolts, and said lower flange fitting comprising a substantially rectangular base plate connected to said column having centrally a horizontally continuous thicker portion from which the base plate is tapered, a horizontal plate projecting from said thicker portion supporting a lower flange of said beam and formed with holes for bolts, a vertical reinforcement plate vertically extending downwardly from the horizontal plate forming therewith a T-shaped shelf, and seats formed on said base plate and formed with holes for bolts and bolt means interconnecting said fittings to said beam and said column through holes therein which register with said bolt holes in said fitting.

\* \* \* \* \*

UNITED STATES PATENT OFFICE
CERTIFICATE OF CORRECTION

PATENT NO. : 3,938,297
DATED : February 17, 1976
INVENTOR(S) : Kuniaki Sato, Kozo Toyama, Eiji Matsushita, Akio Tomita, Shuei Suzuki It is certified that error appears in the above—identified patent and that said Letters Patent are hereby corrected as shown below:

Assignee: Kajima Corporation and Hitachi Metals Ltd

Signed and Sealed this

Eleventh Day of January 1977

[SEAL]

Attest:

RUTH C. MASON
*Attesting Officer*

C. MARSHALL DANN
*Commissioner of Patents and Trademarks*